(12) United States Patent
Burroughs et al.

(10) Patent No.: US 9,220,288 B2
(45) Date of Patent: *Dec. 29, 2015

(54) SYSTEM AND METHOD FOR CONDITIONING FOOD PRODUCT

(71) Applicant: The Hillshire Brands Company, Chicago, IL (US)

(72) Inventors: Thomas B. Burroughs, Elburn, IL (US); Jeffrey L. Bloomer, St. Charles, IL (US); Greg J. Sykes, Cincinnati, OH (US)

(73) Assignee: The Hillshire Brands Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,702

(22) Filed: Mar. 3, 2014

(65) Prior Publication Data

US 2014/0205724 A1    Jul. 24, 2014

Related U.S. Application Data

(63) Continuation of application No. 12/941,718, filed on Nov. 8, 2010, now Pat. No. 8,697,161, which is a continuation of application No. 11/978,545, filed on Oct. 29, 2007, now abandoned.

(60) Provisional application No. 60/855,271, filed on Oct. 30, 2006.

(51) Int. Cl.
*A23L 1/31* (2006.01)
*A23L 1/00* (2006.01)
(Continued)

(52) U.S. Cl.
CPC ............. *A23L 1/0079* (2013.01); *A23L 1/0076* (2013.01); *A23L 1/0128* (2013.01); *A23L 1/0562* (2013.01); *A23L 1/3175* (2013.01); *A23B 4/0056* (2013.01); *A23L 1/3172* (2013.01)

(58) Field of Classification Search
CPC ... A23L 1/0076; A23L 1/0128; A23L 1/0562; A23L 1/3175; A23L 1/0079; A23L 1/3172; A23B 4/0056
USPC .................... 426/92, 105, 277, 305, 412, 576
See application file for complete search history.

(56) References Cited

U.S. PATENT DOCUMENTS 4,026,201 A    5/1977    Fetzer
4,272,864 A    6/1981    Holly
(Continued)

OTHER PUBLICATIONS

U.S. Non-Final Office Action dated Jan. 6, 2010, in grandparent U.S. Appl. No. 11/978,545.

(Continued)

*Primary Examiner* — Michele L Jacobson
*Assistant Examiner* — Walter Moore
(74) *Attorney, Agent, or Firm* — Duane Morris LLP

(57) ABSTRACT

A system and method for conditioning food product is disclosed. The method comprises providing a grill treatment to the food product; packaging the food product; and heating the packaged food product (e.g., partially or fully cooking the food product in its package). The system comprises an apparatus configured to apply a grill treatment to a food product that is being packaged and fully cooked in its package. The system may also comprise a co-extruder configured to extrude the a material layer and a collagen gel layer about the exterior surface of the base layer that is then at least partially coagulated before receiving the grill treatments.

14 Claims, 6 Drawing Sheets

(51) Int. Cl.
*A23L 1/01* (2006.01)
*A23L 1/0562* (2006.01)
*A23B 4/005* (2006.01)
*A23L 1/317* (2006.01)

(56) References Cited

U.S. PATENT DOCUMENTS

| | | | |
|---|---|---|---|
| 4,297,942 A | 11/1981 | Benson et al. |
| 4,338,702 A | 7/1982 | Holly |
| 4,366,182 A | 12/1982 | Kohler et al. |
| 4,373,431 A | 2/1983 | Wallick et al. |
| 4,384,006 A | 5/1983 | Wallick |
| 4,419,375 A | 12/1983 | Willard et al. |
| 4,433,621 A | 2/1984 | Van Wyk et al. |
| RE31,857 E | 4/1985 | Holly |
| 4,660,467 A | 4/1987 | Waks |
| 4,749,582 A | 6/1988 | Wardell |
| 4,905,587 A | 3/1990 | Smithers |
| 4,917,924 A | 4/1990 | Huang et al. |
| 4,985,260 A | 1/1991 | Niaura et al. |
| 5,030,486 A | 7/1991 | Huang et al. |
| 5,084,283 A | 1/1992 | Oxley et al. |
| 5,085,890 A | 2/1992 | Niaura et al. |
| 5,104,349 A | 4/1992 | Van Der Dungen |
| 5,110,601 A | 5/1992 | Rao et al. |
| 5,185,172 A | 2/1993 | Barkhau et al. |
| 5,211,106 A | 5/1993 | Lucke |
| 5,279,046 A | 1/1994 | Vincent |
| 5,279,516 A | 1/1994 | Townsend |
| 5,354,228 A | 10/1994 | Smith et al. |
| 5,356,646 A | 10/1994 | Simic-Glavaski et al. |
| 5,409,336 A | 4/1995 | Jericevich et al. |
| 5,532,014 A | 7/1996 | Kobussen et al. |
| 5,585,129 A | 12/1996 | Geddes et al. |
| 5,609,901 A | 3/1997 | Geddes et al. |
| 5,759,602 A | 6/1998 | Kobussen et al. |
| 5,843,504 A | 12/1998 | Kobussen et al. |
| RE36,172 E | 3/1999 | Kobussen et al. |
| 5,888,131 A | 3/1999 | Kobussen et al. |
| 5,938,520 A | 8/1999 | Scherch |
| 5,951,390 A | 9/1999 | Kobussen et al. |
| 5,989,609 A | 11/1999 | Kobussen et al. |
| 5,992,305 A | 11/1999 | Naivar |
| 6,013,295 A | 1/2000 | Kobussen et al. |
| 6,024,637 A | 2/2000 | Scherch |
| 6,042,871 A | 3/2000 | Cohen |
| 6,054,155 A | 4/2000 | Kobussen et al. |
| 6,060,104 A | 5/2000 | Blanga |
| 6,153,234 A | 11/2000 | Kobussen et al. |
| 6,153,244 A | 11/2000 | Stanger et al. |
| 6,187,362 B1 | 2/2001 | Breu et al. |
| 6,234,891 B1 | 5/2001 | Maria Klaassen |
| 6,245,369 B1 | 6/2001 | Kobussen et al. |
| 6,277,018 B1 | 8/2001 | Cody et al. |
| 6,290,590 B1 | 9/2001 | Kobussen et al. |
| 6,331,104 B1 | 12/2001 | Kobussen et al. |
| 6,379,733 B2 | 4/2002 | Matthews et al. |
| 6,428,830 B1 | 8/2002 | Matthews et al. |
| 6,471,042 B1 | 10/2002 | Van De Dungen et al. |
| 6,756,068 B1 | 6/2004 | Kafentzis et al. |
| 6,780,452 B2 | 8/2004 | Kuijpers et al. |
| 6,913,136 B2 | 7/2005 | van den Dungen et al. |
| 6,919,122 B2 | 7/2005 | Keese et al. |
| 7,038,182 B2 | 5/2006 | Young et al. |
| 8,697,161 B2 * | 4/2014 | Burroughs et al. ............ 426/277 |
| 2001/0007691 A1 | 7/2001 | Matthews et al. |
| 2001/0046535 A1 | 11/2001 | Bowling |
| 2002/0012729 A1 | 1/2002 | Ewald et al. |
| 2002/0012731 A1 | 1/2002 | van Esbroeck et al. |
| 2002/0064580 A1 | 5/2002 | Gord et al. |
| 2002/0064587 A1 | 5/2002 | Redding, Jr. et al. |
| 2002/0090427 A1 | 7/2002 | Jordan |
| 2002/0115401 A1 | 8/2002 | Kobussen et al. |
| 2002/0137452 A1 | 9/2002 | Bontje |
| 2003/0134014 A1 | 7/2003 | Bergmans et al. |
| 2003/0211819 A1 | 11/2003 | Bontje et al. |
| 2004/0043717 A1 | 3/2004 | Shefet |
| 2004/0043718 A1 | 3/2004 | Shefet |
| 2004/0072524 A1 | 4/2004 | Van Den Dungen et al. |
| 2004/0091581 A1 | 5/2004 | Joly et al. |
| 2004/0105926 A1 | 6/2004 | Kuijpers et al. |
| 2004/0121054 A1 | 6/2004 | Berrier et al. |
| 2004/0166216 A1 | 8/2004 | Marsden et al. |
| 2004/0224056 A1 | 11/2004 | Jordan |
| 2004/0253363 A1 | 12/2004 | Nakano et al. |
| 2005/0003062 A1 | 1/2005 | van Esbroeck et al. |
| 2005/0008742 A1 | 1/2005 | Griesbach et al. |
| 2005/0031741 A1 | 2/2005 | Morgan et al. |
| 2005/0042334 A1 | 2/2005 | Schleker et al. |
| 2005/0064118 A1 | 3/2005 | Damstetter |
| 2005/0084586 A1 | 4/2005 | Redding, Jr. et al. |
| 2005/0112263 A1 | 5/2005 | Schmitt |
| 2005/0136202 A1 | 6/2005 | Kendig et al. |
| 2006/0003062 A1 | 1/2006 | Paviot |
| 2006/0035005 A1 | 2/2006 | McMindes et al. |
| 2006/0035006 A1 | 2/2006 | McMindes et al. |
| 2006/0127538 A1 | 6/2006 | Appleby |
| 2006/0159806 A1 | 7/2006 | Darin et al. |
| 2006/0172672 A1 | 8/2006 | Shefet |
| 2006/0178101 A1 | 8/2006 | Haschke et al. |
| 2006/0263505 A1 | 11/2006 | Schmitt |

OTHER PUBLICATIONS

U.S. Final Office Action dated Jul. 8, 2010, in grandparent U.S. Appl. No. 11/978,545.
U.S. Non-Final Office Action dated Jan. 26, 2012, in parent U.S. Appl. No. 12/941,718.
U.S. Non-Final Office Action dated Jul. 13, 2012, in parent U.S. Appl. No. 12/941,718.
U.S. Final Office Action dated Oct. 22, 2012, in parent U.S. Appl. No. 12/941,718.
U.S. Non-Final Office Action dated Jun. 5, 2013, in parent U.S. Appl. No. 12/941,718.

* cited by examiner

SYSTEM AND METHOD FOR CONDITIONING FOOD PRODUCT

CROSS-REFERENCE TO RELATED PATENT APPLICATIONS

This application is a continuation of U.S. application Ser. No. 12/941,718 which was filed 8 Nov. 2010 and is now U.S. Pat. No. 8,697,161, which is a continuation of U.S. application Ser. No. 11/978,545, filed 29 Oct. 2007, which claims priority from U.S. Provisional Application No. 60/855,271, filed 30 Oct. 2006, all of which are incorporated herein in their entirety as set forth in full.

BACKGROUND

The present invention relates to a system and method for conditioning food product. More specifically, the present invention relates to a system and method for providing a grill treatment to a prepared food product (such as sausage) that is then fully cooked in its packaging for the purpose of adding appearance, taste, and/or texture qualities associated with cooking the food product on a grill.

Prepared foods are sold in a variety of conditions, including uncooked, fully cooked, cured, and uncured. Fully cooked, prepared foods are typically fully cooked before being packaged.

When a food product is fully cooked prior to being packaged, it is also generally known to alter the appearance of food products to provide a more appealing and flavorful appearance, such as applying grill marks to hamburgers and chicken. Fully cooked, prepared foods may also be fully cooked after being packaged. Fully cooking a food product in its packaging has several advantages over fully cooking prior to packaging, including reducing or eliminating the use of preservative, extending refrigerated shelf-life, and decreasing the potential for contamination of the food product. An example of fully cooking a prepared food in its packaging is co-extruded sausage, which is manufactured by co-extruding meat blend with a collagen gel. The collagen is applied as a gel to an outer surface of the meat and is coagulated to provide an encasement for the meat. Coagulation typically occurs by subjecting the co-extruded strand to a brine (salt) solution to remove water content from the collagen gel, followed by one or more applications of heat and a chemical to cross-link the collagen gel to prevent re-absorption of water. The co-extruded method has several advantages over the traditional method of separately stuffing or packing meat into a natural casing, including lower cost (continuous manufacturing of product, cost of goods, decreased labor, etc.) and more consistency between products.

Accordingly, it would be advantageous to provide a system and method for conditioning food product. It would also be advantageous to provide a system and method for providing a grill treatment to a prepared food product (such as sausage) that is then fully cooked in its packaging for the purpose of adding appearance, taste, and/or texture qualities, properties, and characteristics associated with grilling. It would further be advantageous to provide a system and method for providing a grill treatment to a co-extruded meat product such as sausage. It would be desirable to provide for a system and method for conditioning food product having one or more of these or other advantageous features. To provide an inexpensive, reliable, and widely adaptable system and method for conditioning food product that avoids the above-referenced and other problems would represent a significant advance in the art.

SUMMARY

An embodiment of the present invention relates to a method for manufacturing a food product. The method comprises providing a grill treatment to an exterior surface of the food product; packaging the treated food product; and heating the packaged food product (e.g., partially or fully cooking the food product). The food product may be a sausage with a meat or non-meat base material and a casing formed from a collagen gel. The method may then also comprise co-extruding the base material and collagen gel, at least partially coagulating the collagen gel, and then applying the one or more grill marks.

Another embodiment of the present invention also relates to a system for manufacturing a food product having a base layer and an outer skin layer. The system comprises a co-extruder configured to extrude the base material layer and a collagen gel layer about the exterior surface of the base layer; an apparatus configured to at least partially coagulate the collagen gel layer; and an apparatus configured to apply a grill treatment to the at least partially coagulated collagen gel layer prior to the food product being packaged and fully cooked in its package.

Another embodiment of the present invention relates to a system for producing food product links that comprises a heated upper roller; a heated lower roller; a conveyer including a plurality of cradles configured to move the food product links between the upper roller and the lower rollers. Each cradle is configured to receive and support a food product link. The heated upper roller and the heated lower roller provide grill marks to the food product links as the cradles pass between the rollers.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the embodiments which follow.

Figure 1:
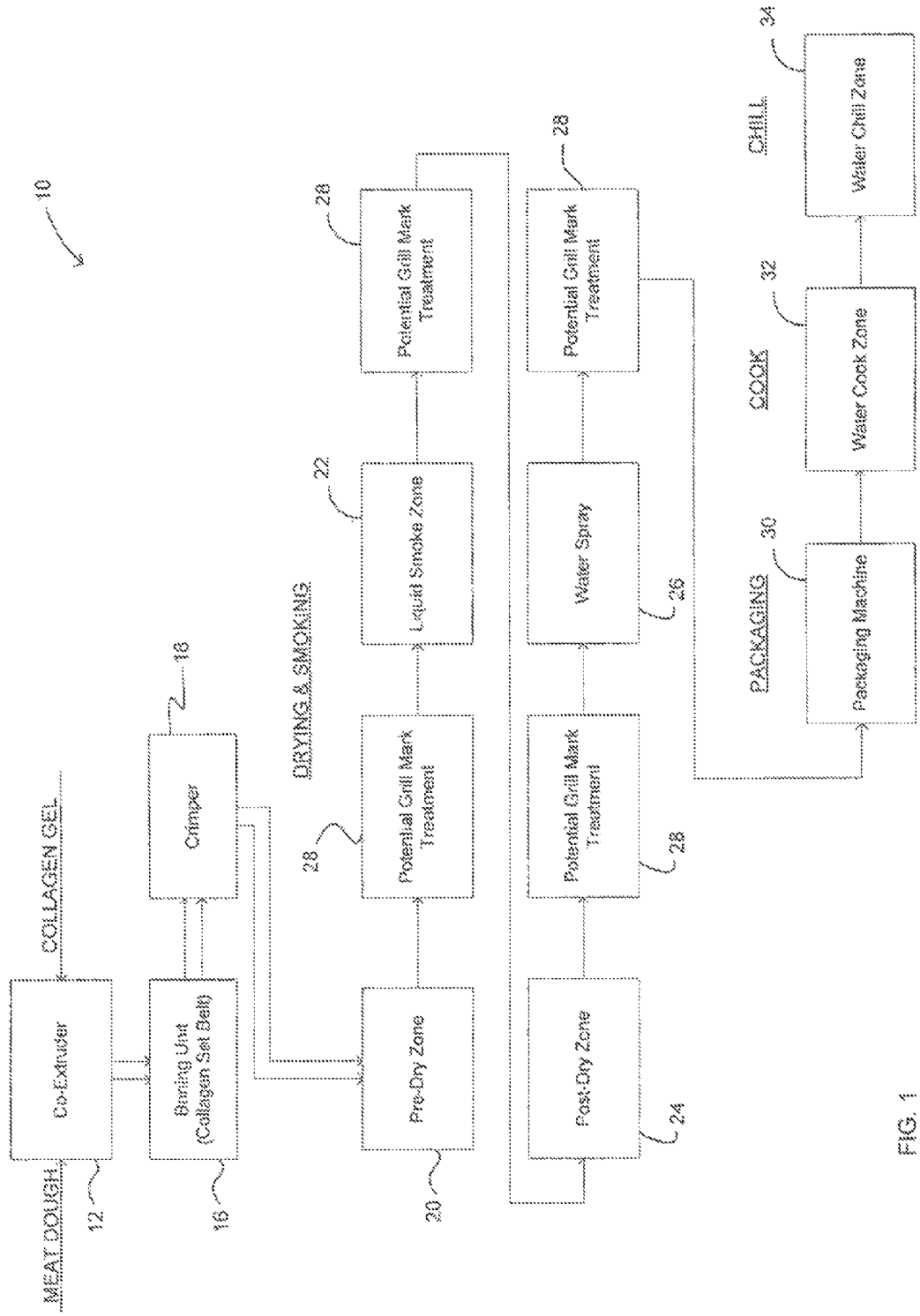
FIG. 1 is a schematic flow diagram of a system and process for manufacturing a food product.

Before explaining a number preferred, exemplary, and alternative embodiments of the invention in detail it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION OF THE PREFERRED AND EXEMPLARY EMBODIMENTS

Before proceeding to the detailed description of preferred and exemplary embodiments, several comments can be made about the general applicability and the scope thereof. While the components of the disclosed embodiments are illustrated as a system and method for conditioning co-extruded sausage links, the features of the disclosed embodiments have a much wider applicability. For example, providing a grill treatment to a food product prior the food product undergoing a cooking process in its packaging is adaptable for a variety of food products where if is desirable to condition the exterior (e.g., providing a grill treatment) for the purpose of adding appearance, taste, and/or texture qualities, properties, and characteristics associated with grilling (e.g., grill marks, browning, etc.) and then cooking the food product in its packaging. As used in this description, "food product" or "prepared foods" includes whole, ground, blended, and/or emulsified meat and non-meat products in a variety of forms such as links (e.g., sausage, bratwurst, hot dogs, wieners, etc. with or without a collagen, or non-collagen casing), patties (e.g., breakfast sausage, hamburger patties, etc.), rope-shaped, filets (e.g., steak, pork, poultry, etc.), or the like.

Proceeding now to descriptions of the preferred and exemplary embodiments, FIG. 1 illustrates a schematic block flow diagram of a system and process 10 for manufacturing food products (e.g., sausage links) where a grilling treatment is applied before the sausage links are cooked in their packaging. According to an exemplary embodiment, a meat (or non-meat) base material (e.g., a "dough" or blend) and a collagen gel are provided (e.g., fed, conveyed, etc.) to an apparatus shown as a co-extrusion machine 12. The co-extrusion machine 12 extrudes the meat base material and the collagen gel on the outer surface of the meat base material to form a co-extruded rope or strand. The co-extrusion machine 12 may have one or more extrusion heads to provide single, dual, etc. co-extruded ropes. The collagen gel applied to the outer surface of the meat is then, solidified (i.e., coagulated) by subsequent operations to provide a casing (e.g., encasement, skin, etc.) for the meat base material. According to alternative embodiments, the meat base is co-extruded with other materials (e.g., sodium alginate) that will form the casing (and which require alternative coagulation downstream processes).

According to an exemplary embodiment, the co-extruded rope from the co-extrusion machine 12 is conveyed to an apparatus (shown as a brining unit 16) to transform (e.g., coagulate, solidify, etc.) the collagen gel into a casing that surrounds the meat blend. The collagen gel applied during co-extrusion may be susceptible to damage. The brining step firms or strengthens the collagen gel coating sufficiently for additional manufacturing processes. To form the casing, the brining unit 16 subjects the co-extruded rope to a solution that removes water content from the collagen gel. According to an exemplary embodiment, the solution is a brine salt, such as sodium chloride. According to other embodiments, the solution may be any of a variety of different salts or solutions that remove water from the gel.

After the collagen gel is at least partially coagulated, the continuous co-extruded strand of meat blend and collagen gel is conveyed to an apparatus shown as a crimper 18. The crimper 18 forms the continuous strand into segmented portions or links in a pinching operation and separates the links.

The separated links are then subject to drying and smoking operations. The sausage links are first conveyed to a pre-dry zone 20 where heat is applied to the links to further coagulate the collagen gel and to raise the core temperature of the links to partially cook the meat. Further coagulation of the collagen continues the process of increasing the strength of the casing by removing additional water content from the collagen gel (which by now has been partially coagulated/solidified). The brining step and the heat shrink the gel down to a skin layer.

After the collagen gel is further coagulated by the heat in the pre-dry zone 20, the links are conveyed to an apparatus (shown as a "liquid smoke zone" 22) to set the collagen. In the liquid smoke zone 22, a material is applied to the links to set or "cross-link" fibers of the collagen so that the collagen layer will not re-absorb water and return to a gel state or condition. The cross-linking material may be applied by any of a variety of conventionally known methods, such as spraying, pouring, deluging, bathing, emersion, or the like. The cross-linking material is conventionally referred to as "liquid smoke" due to Its acid content and presence of aldehydes, but may be any of a variety of natural or synthetic chemicals that cross-links the fibers of the collagen (e.g., food grade or otherwise allowed by the Food and Drug Agency (FDA) or the U.S. Department of Agriculture (USDA)). The cross-linking material may also be configured to provide a desired flavor (e.g., smoke, etc).

After the liquid smoke is applied, the links are conveyed to an apparatus for further heating (shown as a post-dry zone 24) to further partially cook the meat blend, to further dry the gel, and to dry the liquid smoke. Drying of the liquid smoke sets the flavor and color of the liquid smoke and prevents the liquid smoke from being washed away in subsequent operations.

After the post-dry zone 24, the links may be conveyed to a water spray apparatus 26 to rinse residue and non-set liquid smoke.

During the drying and smoking processes, the exterior of the links are conditioned (e.g., undergo a grill treatment) for the purpose of adding appearance, taste, and/or texture qualities, properties, and characteristics associated with grilling (e.g., grill marks, flavor, color, or other indicia). Conditioning of the exterior may occur at a variety of locations during the drying and smoking process, which are identified as "potential grill treatment" 28 in FIG. 1. Exemplary apparatuses and processes for conditioning the exterior of the links is further discussed below with regard to FIGS. 2-7.

Still referring to FIG. 1, after the drying and smoking processes, the links are conveyed to a packaging apparatus 30. The packaging apparatus 30 preferably packages the links in a thermoplastic material in a vacuum atmosphere that provides a desired seal, tightly conforms to the links, and removes any air from inside of the packaging. Such packaging is intended to minimize potential exposure to oxygen, moisture, and contaminants and to facilitate the cooking process by eliminating space between the exterior of the packaging and the links to enhance conduction of heal energy. According to alternative embodiments, the links may be packaged by any of a variety of conventional machines in a variety of packaging configurations and materials.

The packaged links are then conveyed to an apparatus (shown as water cook zone 32) that completes the cooking cycle (i.e., provides a packaged link that is fully cooked). According to an exemplary embodiment, the packaged links are submerged in water heated to a predetermined temperature for a predetermined amount of time. Alternatively, the packaged links are subject to heated water by any of a variety of means (e.g., spraying, pouring, deluging, or the like). The temperature of the water and the time that the packaged links are submerged will vary depending on the amount of links, the formulation and size of the link, and the like. Completing the cooking process in the packaging is intended to reduce the potential for contamination of the food product, which might occur if the food product is fully cooked and then packaged. Such contamination also extends the shelf life of the food product without having to use preservatives.

The fully cooked links are then conveyed to an apparatus to cool the heated links (shown as a water chiller zone 34). According to an exemplary embodiment, the links are subjected to chilled water (e.g., spraying, pouring, deluging, bathing, emersion, etc.) that lowers the core temperature of the links to a temperature at a rate designated by regulations of USDA or other entities.

As discussed above, the exterior of the links are conditioned (e.g., subjected to a grill treatment) for the purpose of adding appearance, taste, and/or texture qualities, properties, and characteristics associated with grilling (e.g., grill marks, flavor, color, or other indicia). "Grill treatment" generally relates to the food product being subject to radiated heat (e.g., flame, infrared, etc.) According to a preferred embodiment, the conditioned exterior includes a grill treatment that imparts, among other effects, a plurality of grill marks 40. Grill marks 40 are intended to provide a grilled appearance and texture as well as flavor to the sausage link by caramelizing and/or browning the exterior of the link. Providing such a cooked in package sausage with a conditioned exterior allows for additional cooking options to the consumer. For example, a pre-cooked sausage with a conditioned exterior may be heated for consumption in a microwave or other rapid heating device and yet still provide the desired grilled appearance and flavor without having to go through the effort of grilling an uncooked (raw) link. Exemplary apparatuses and process for applying a grill treatment (Including imparting grill marks 40 or other indicia) to the links is shown in FIGS. 2-7.

Figure 2:
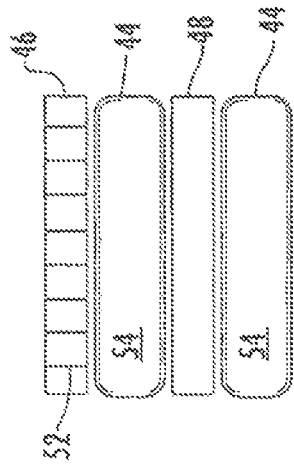
FIG. 2 is a schematic side view of a conveyor apparatus for conditioning a food product.
Figure 3:
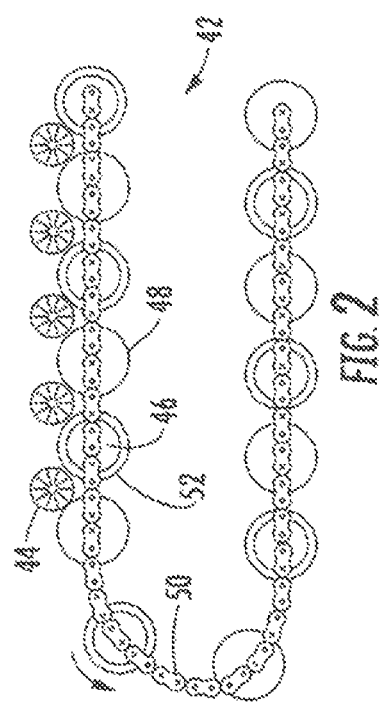
FIG. 3 is a top view of FIG. 2.
Figure 4:
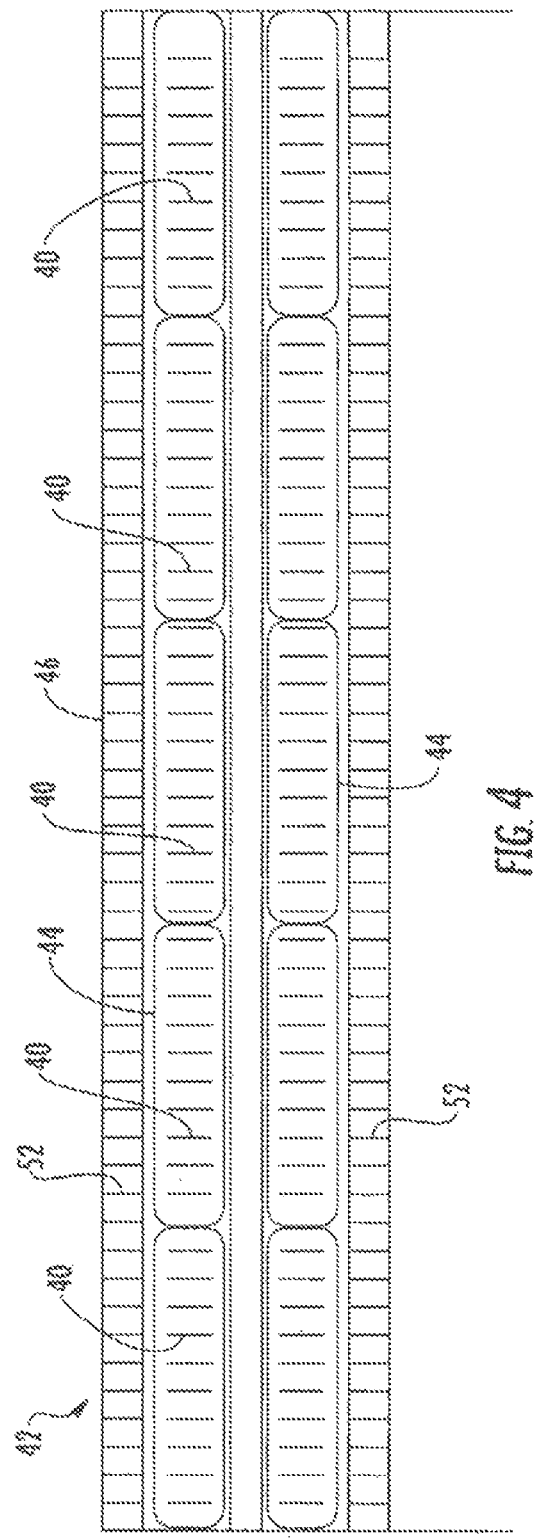
FIG. 4 is a top view of FIG. 3 in an exemplary embodiment.

Referring to FIGS. 2-4, a conveyor system 42 is shown conveying and providing a grill treatment to a plurality of sausage links 44. Conveyor system 42 includes a plurality of grilling rollers 46 intermittent a plurality of idle rollers 48. The grilling rollers 46 and idle rollers 48 are coupled to a chain 50 that is configured to move rollers 46, 48 in a predetermined circuit. According to an exemplary embodiment, the grilling roller 46 is configured to provide links 44 with grill marks (and/or a brown exterior color/tone). The grilling roller 46 includes a plurality of raised portions or projections 52 that are heated to a temperature that would sear or otherwise concentrate heat energy in a desired shape and orientation to provide grill marks 40 or other indicia (e.g., brand the outer surface 54 of links 44). Projections 52 may be heated by a flame (e.g., on interior of circuit) or by an electrical current applied to a resistive element in roller 46. Alternatively, the projections 52 may be heated by any of a variety of conventional techniques. The outer surface 54 of links may also be conditioned (e.g., browned) by heat emitted from grilling roller (e.g., radiated as infrared, energy) or from the idle roller 48. Grilling roller 46 is rotated about its longitudinal axis so that the grill treatment is evenly applied by roller 46 and absorbed by links 44. Idle roller 48 freely rotates about its longitudinal axis and provides support to link 44. Grill marks 40 may be provided around the entire perimeter or circumference of links 44 by projections 52 that are generally uniform in height and width. According to an exemplary embodiment, the height, width, length, and orientation of projections 52 are configured to provide an accurate simulation or representation of the shape and look of grill marks that were applied by a grill or to provide a desired indicia to links 44. FIGS. 3 and 4 show schematic top views of a one link conveyer system and of a five link conveying system. According to alternative embodiments, any of a variety of numbers of links may be conveyed together (e.g., thirteen links to provide an industry standard six foot or seven foot length).

Figure 5:
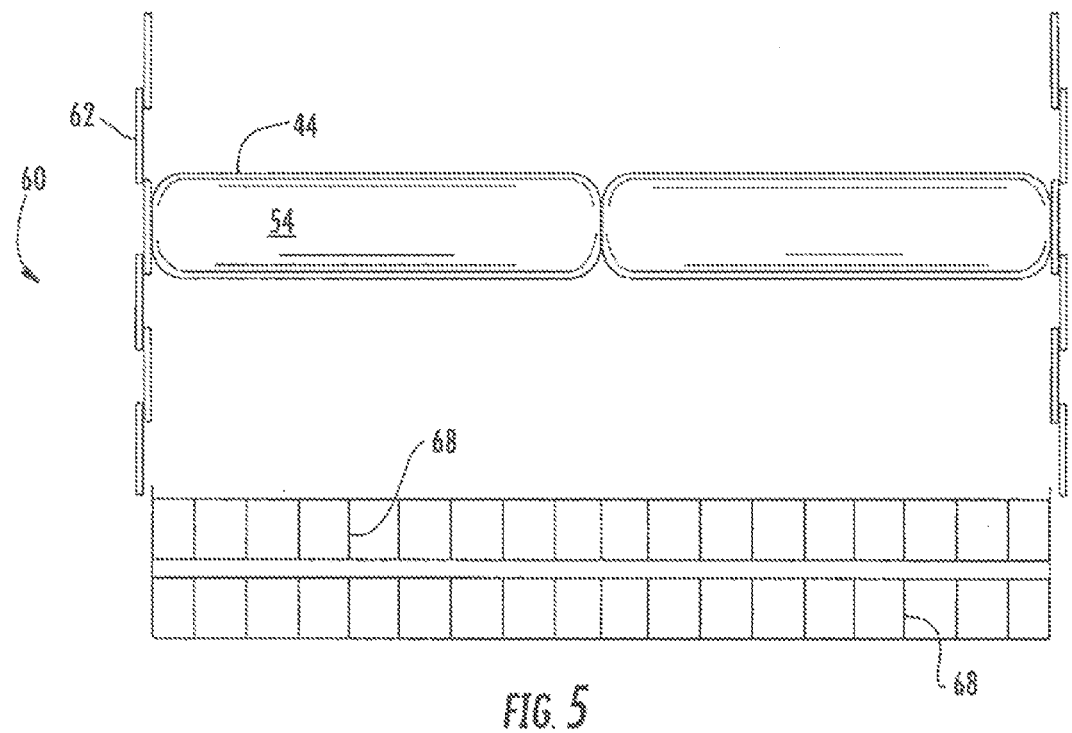
FIG. 5 is a schematic top view of another conveyor apparatus for conditioning a food product.
Figure 6:
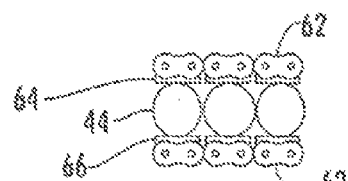
FIGS. 6 and 7 are side views of FIG. 5.
Figure 7:
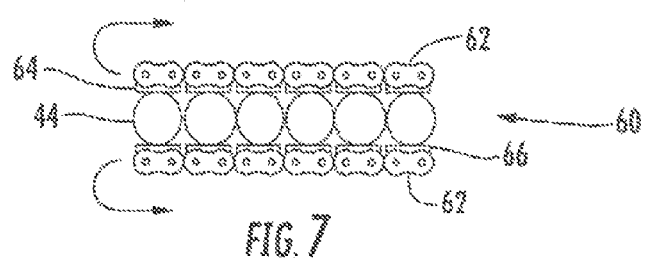

Referring to FIGS. 5-7, a conveying system 60 is shown according to yet another exemplary embodiment. Conveying system 60 moves (or transports) and provides a grill treatment to sausage links 44. Conveying system 60 includes a chain 62 and a plurality of upper and lower heated bars 64, 66 coupled to the chain 62. The links 44 are retained or secured by being in contact with the upper and lower heated bars 64, 66. The links 44 are generally stationary relative to the heated bars 64, 66 (i.e., do not roll or rotate). The heated bars 64, 66 include one or more raised portions or projections 68 that are heated to a temperature that would sear or otherwise concentrate heat energy in a desired shape and orientation to provide grilling marks (or other indicia). The height, width, length, and orientation of projections 68 are configured to provide an accurate simulation or representation of the shape and look, of grill marks that were applied by a grill. Projections 68 may be heated by a flame (e.g., on interior of circuit) or by an electrical current applied to a resistive element in roller. Alternatively, projections may be heated by any of a variety of conventional techniques. The outer surface 54 of links 44 also undergo grill treatment (e.g., browned) by heat emitted from the non-raised surface of the heated bars 64, 66.

Figure 8:
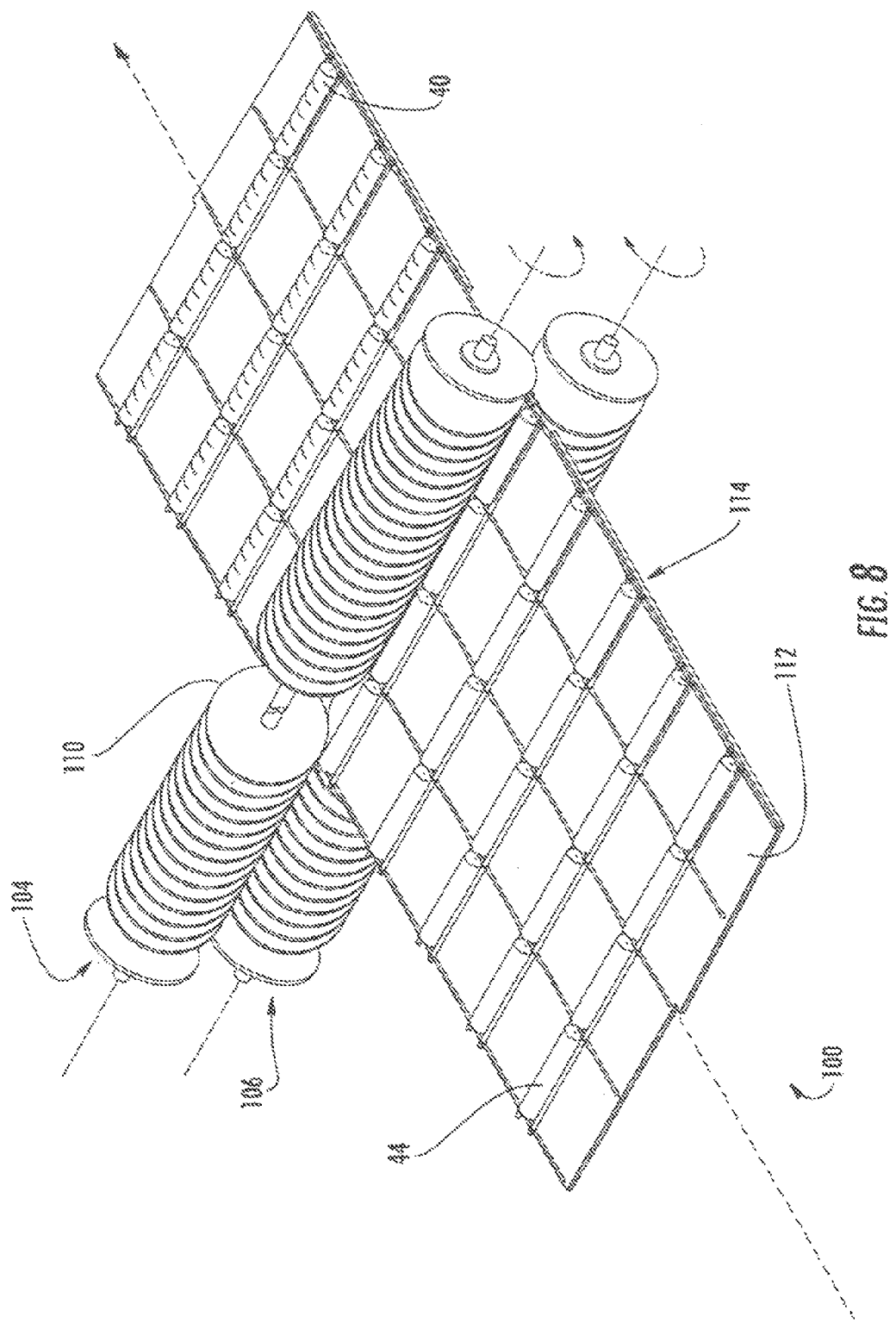
FIG. 8 is a perspective view of an exemplary embodiment of an apparatus for applying grill marks to a food product.
Figure 9:
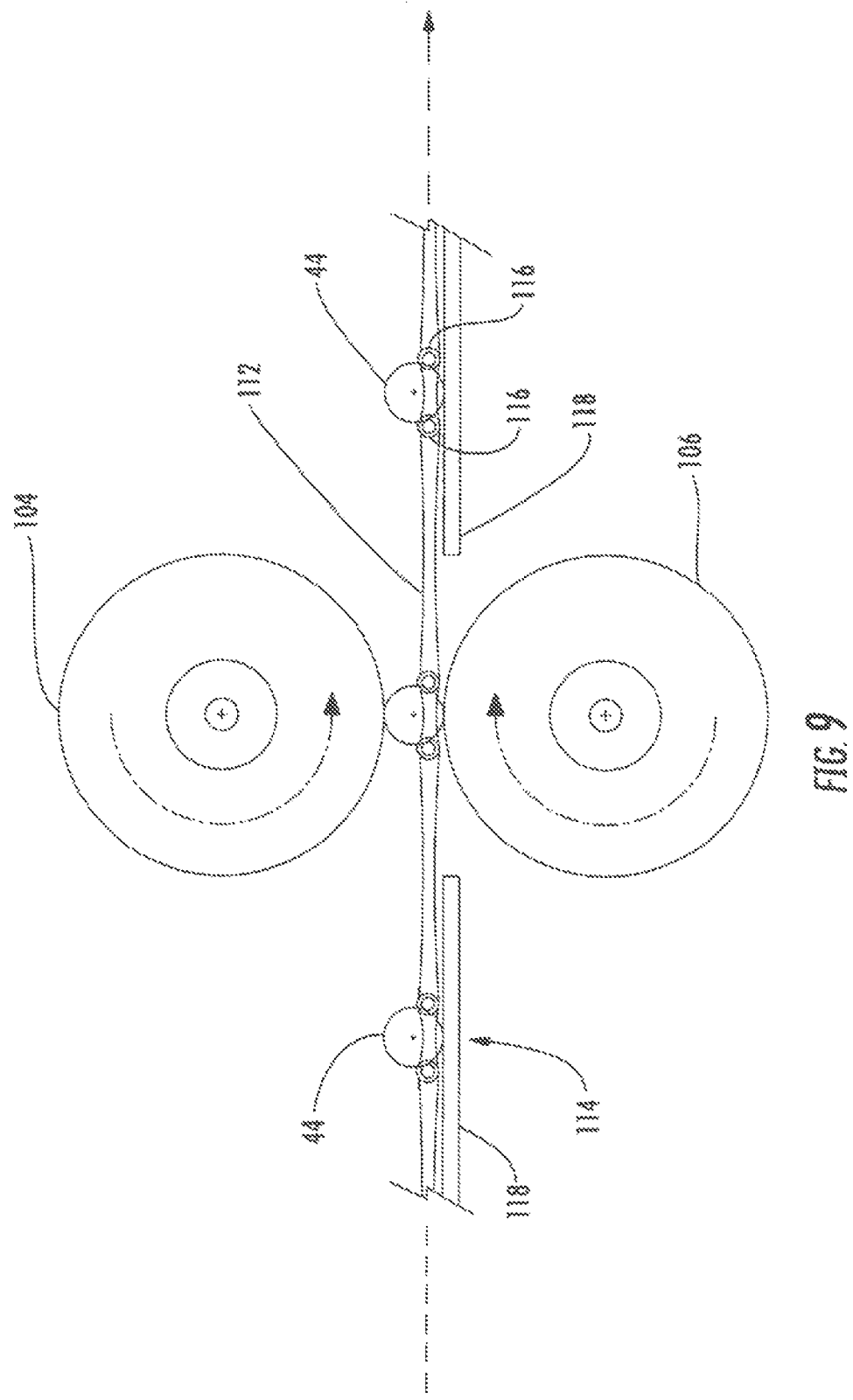
FIG. 9 is a side view of the apparatus of FIG. 8.

Referring to FIGS. 8 and 9, a conveyor system 100 is shown conveying and providing a grill treatment to a plurality of sausage links 44. An upper grilling roller 104 is positioned above the conveyer system 100 and a lower grilling roller 106 is positioned below the conveyer system 100. The sausage links 44 are conveyed between grilling rollers 104, 106. According to an exemplary embodiment, the grilling rollers 104, 106 are configured to provide grill marks 40 (and/or a brown exterior color/tone) to links 44. The grilling rollers 104, 106 each includes a plurality of raised portions or projections 110 (fins, blades, wheels, discs, etc.) that are angled relative to the links 44 (e.g., a 45 degree angle relative to the links 44, to the direction of conveyance of links 44, and the longitudinal axis of rollers 104, 106). Upper grilling roller 44 applies grill, marks 40 to an upper surface of links 102, and lower grilling roller 106 applies grill marks 40 to a lower surface of links 44. Projections 110 are heated to a temperature that would sear or otherwise concentrate heat energy in a desired shape and orientation to provide grill marks 110 or other indicia (e.g., brand the outer surface of links 44). Projections 110 may be heated by a flame (e.g., on interior of circuit) or by an electrical current applied to a resistive element in roller. According to an exemplary embodiment, a flame is used to heat a heating medium above upper roller 104 and a flame is used to heat a heating medium below lower roller 106. Alternatively, the projections 110 may be heated by any of a variety of conventional techniques. Grilling rollers 104, 106 are rotated about its longitudinal axis so that the grill treatment is evenly applied and absorbed by links 102. Grill marks 40 may be provided around the entire perimeter or circumference of links 44 by projections 110 that are generally uniform in height and width. Conveying system 100 also includes a conveyer belt 112 (e.g., chain link mesh) that moves links 44 between rollers 104, 106. Belt 112 includes a plurality of spaced-apart cradles 114 that receive and retain links 44. Each cradle 114 comprises a pair of spaced-apart members 116 (e.g., rods, tubes, etc.) that support a link 44 located between the members 116. The distance between members 116 spaced to allow links 44 to project above belt 112 and cradle 114 and engage rollers 104, 106. Conveyer supports 118 are located on both sides (up stream and down stream) of rollers 104, 106. Supports 118 are configured to provide support to portions of conveyer belt 114. Belt 114 is unsupported as it passes between rollers 104, 106. FIGS. 8 and 9 show views of a conveyer system for four rows of links. According to alternative embodiments, any of a variety of numbers of rows of links may be conveyed together.

Figure 10:
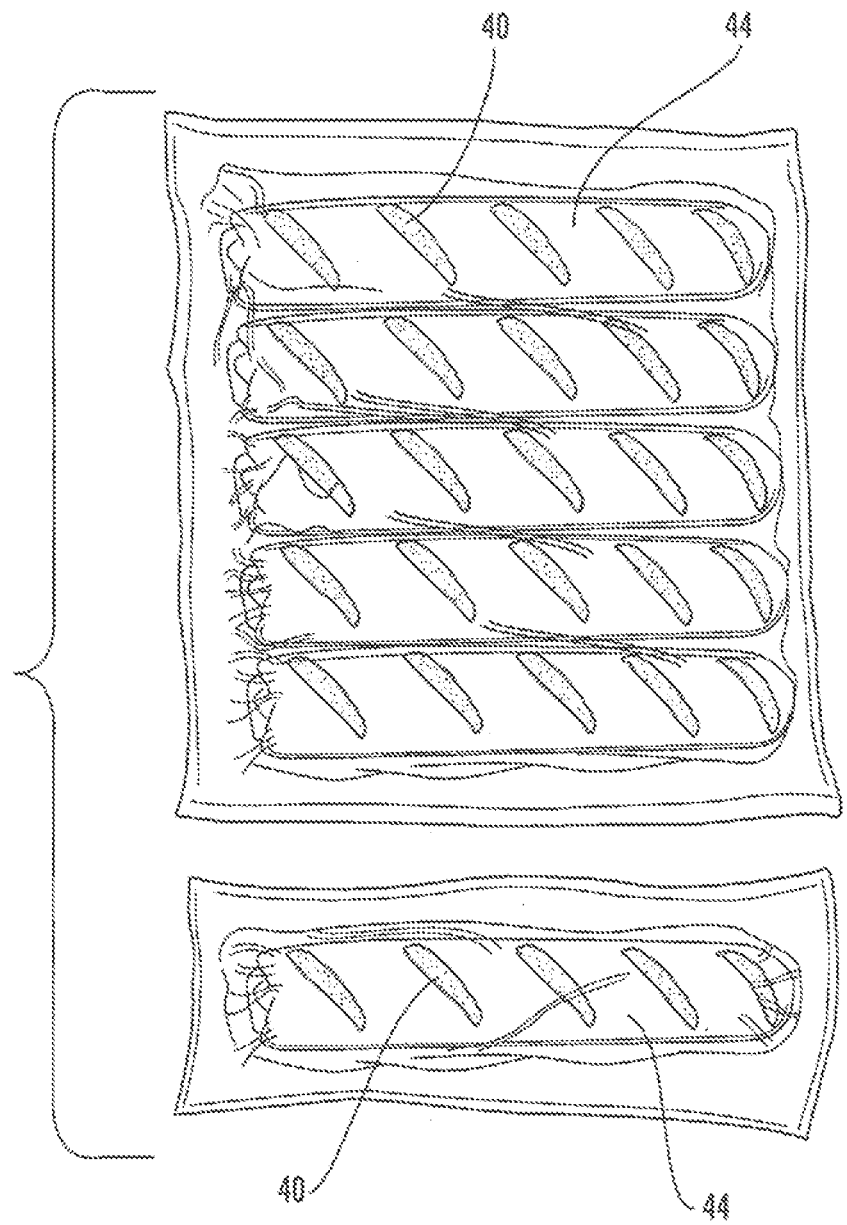
FIG. 10 is a perspective view of food products (sausages) that have had grill marks applied, packaged, and then cooked in the package.

FIG. 10 shows exemplary finished products of links 44 that have received a surface treatment (browned exterior and grill marks 40) and then packaged and cooked in the packaging.

* * *

It is important to note that the construction and arrangement of the elements of the system and method for conditioning food product as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. For example, for purposes of this disclosure, the terra "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components. Accordingly, all such modifications are intended to be included within the scope of the present invention as defined in the appended embodiments. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method for manufacturing a food product, the method comprising, performing in this order:
   co-extruding a base material and a collagen gel into a co-extruded product, the collagen gel provided to an exterior surface of the base material;
   partially coagulating the collagen gel to a first partially coagulated and un-set state, the collagen gel forming a casing about the base material;
   applying a first heat treatment to the co-extruded product to cook the base material to a partially cooked first state and further coagulate the collagen gel to a second partially coagulated and un-set state;
   applying a cross-linking material to further coagulate the collagen gel from the second partially coagulated and un-set state to a fully set state;
   applying a grill treatment to the co-extruded product while the collagen gel is in the fully set state;
   applying a second heat treatment to the co-extruded product to further partially cook the base material to a partially cooked second state, and dry the collagen gel;
   packaging the co-extruded product while the base material is in the partially cooked second state; and
   heating the packaged co-extruded product to further cook the base material to a fully cooked state.

2. The method of claim 1, further comprising, prior to providing the grill treatment, drying the collagen gel.

3. The method of claim 1, further comprising, prior to partially cooking the co-extruded product, partially coagulating the collagen gel to the first partially coagulated and un-set state by subjecting the co-extruded base material and collagen gel to a solution that extracts water content from the collagen gel.

4. The method of claim 1 wherein providing the grill treatment comprises applying concentrated heat.

5. The method of claim 4 wherein applying concentrated heat comprises contacting an exterior surface of the collagen gel with a heated member.

6. The method of claim 1 wherein providing the grill treatment comprises conveying the co-extruded base material and collagen gel between a first roller and second roller, the first roller configured to rotate and having one or more heated projections supporting the co-extruded base material and collagen gel and configured to apply one or more grill marks to the co-extruded base material and collagen gel.

7. The method of claim 1 wherein providing the grill treatment comprises conveying the co-extruded base material and collagen gel between an upper heated member and a lower heated member, the upper heated member and the lower heated member each having one or more heated projections supporting the co-extruded base material and collagen gel and configured to apply one or more grill marks.

8. A method for manufacturing a food product, the method comprising, performing in this order:
   co-extruding a base material and a collagen gel into a co-extruded product, the collagen gel provided to an exterior surface of the base material;
   partially coagulating the collagen gel to a first partially coagulated and un-set state, the collagen gel forming a casing about the base material;
   applying a first heat treatment to the co-extruded product to cook the base material to a partially cooked first state and further coagulate the collagen gel to a second partially coagulated and un-set state;
   applying a cross-linking material to further coagulate the collagen gel from the second partially coagulated and un-set state to a fully set state;
   applying a second heat treatment to the co-extruded product to further partially cook the base material to a partially cooked second state, and dry the collagen gel;
   applying a grill treatment to the co-extruded product;
   packaging the co-extruded product while the base material is in the partially cooked second state; and
   heating the packaged co-extruded product to further cook the base material to a fully cooked state.

9. The method of claim 8 further comprising, prior to providing the grill treatment, drying the collagen gel.

10. The method of claim 8, further comprising, prior to partially cooking the co-extruded product, partially coagulating the collagen gel to the first partially coagulated and un-set state by subjecting the co-extruded base material and collagen gel to a solution that extracts water content from the collagen gel.

11. The method of claim 8 wherein providing the grill treatment comprises applying concentrated heat.

12. The method of claim 11 wherein applying concentrated heat comprises contacting an exterior surface of the collagen gel with a heated member.

13. The method of claim 8 wherein providing the grill treatment comprises conveying the co-extruded base material and collagen gel between a first roller and second roller, the first roller configured to rotate and having one or more heated projections supporting the co-extruded base material and collagen gel and configured to apply one or more grill marks to the co-extruded base material and collagen gel.

14. The method of claim 8 wherein providing the grill treatment comprises conveying the co-extruded base material and collagen gel between an upper heated member and a lower heated member, the upper heated member and the lower heated member each having one or more heated projections supporting the co-extruded base material and collagen gel and configured to apply one or more grill marks.

* * * * *

UNITED STATES PATENT AND TRADEMARK OFFICE
CERTIFICATE OF CORRECTION

PATENT NO. : 9,220,288 B2  
APPLICATION NO. : 14/195702  
DATED : December 29, 2015  
INVENTOR(S) : Thomas B. Burroughs, Jeffrey L. Bloomer and Greg J. Sykes Page 1 of 1

It is certified that error appears in the above-identified patent and that said Letters Patent is hereby corrected as shown below:

In the specification  
Column 3, line 19, change "if" to --it--  
Column 4, line 23, change "Its" to --its--  
Column 4, line 57, change "heal" to --heat--  
Column 7, line 30, change "terra" to --term--

Signed and Sealed this  
Thirty-first Day of May, 2016

Michelle K. Lee  
*Director of the United States Patent and Trademark Office*